US009686423B2

(12) United States Patent
Haapanen

(10) Patent No.: US 9,686,423 B2
(45) Date of Patent: Jun. 20, 2017

(54) OFFLOADED DATA ENTRY FOR SCANNED DOCUMENTS

(71) Applicant: Tom Haapanen, Heidelberg (CA)

(72) Inventor: Tom Haapanen, Heidelberg (CA)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/538,069

(22) Filed: Nov. 11, 2014

(65) Prior Publication Data
US 2016/0134763 A1 May 12, 2016

(51) Int. Cl.
G06F 3/12 (2006.01)
H04N 1/00 (2006.01)
H04N 1/21 (2006.01)
H04N 1/32 (2006.01)

(52) U.S. Cl.
CPC ......... H04N 1/001 (2013.01); H04N 1/00103 (2013.01); H04N 1/00244 (2013.01); H04N 1/00352 (2013.01); H04N 1/2104 (2013.01); H04N 1/32117 (2013.01); H04N 1/00307 (2013.01); H04N 2201/04 (2013.01); H04N 2201/3278 (2013.01)

(58) Field of Classification Search
CPC combination set(s) only.
See application file for complete search history.

(56) References Cited

U.S. PATENT DOCUMENTS

| 8,468,213 | B2 * | 6/2013 | Kamata | H04N 1/00222 358/1.1 |
| 2003/0117664 | A1 * | 6/2003 | McCarthy, Jr. | H04N 1/00416 358/402 |
| 2004/0070613 | A1 * | 4/2004 | Sprague | G06F 17/3089 715/762 |
| 2006/0092097 | A1 * | 5/2006 | Reddy | G06F 21/41 345/2.1 |
| 2008/0162603 | A1 * | 7/2008 | Garg | G06F 17/218 |
| 2013/0083045 | A1 * | 4/2013 | Berfanger | H04L 67/02 345/522 |
| 2013/0294694 | A1 | 11/2013 | Zhang et al. | |
| 2014/0029032 | A1 | 1/2014 | Hilbert et al. | |

* cited by examiner

Primary Examiner — Henok A Shiferaw
(74) Attorney, Agent, or Firm — Duft Bornsen & Fettig, LLP

(57) ABSTRACT

Embodiments described herein provide the capability to offload a data entry activity from a Multi-Function Printer (MFP) to a remote computing device, such as a user's computer, tablet, smartphone, etc. In one embodiment, the MFP generates a scan of a document for a user, and holds the scanned document pending a data entry activity that assigns metadata to the scanned document. The MFP identifies a remote computing device for performing the data entry activity by the user, provides a notification to the remote computing device requesting the metadata for the scanned document, and receives the metadata from the remote computing device. The MFP assigns the metadata to the scanned document, and to release the scanned document to a scan destination.

17 Claims, 7 Drawing Sheets

OFFLOADED DATA ENTRY FOR SCANNED DOCUMENTS

FIELD OF THE INVENTION

The invention relates to the field of document scanning, and in particular, to data entry operations associated scanned documents.

BACKGROUND

In an office environment, users are often tasked with scanning documents to allow a document repository the ability to enable multiple users access to the documents. Typically, the scanned document is associated with user-defined data, such as which user generated the scanned document, client information for the scanned document, key words for the scanned document that allow for document indexing, etc.

However, office scanners (e.g., such as provided by a Multi-Function Printer (MFP)), generally have poor data entry capabilities. For example, the MFP may not include a full sized keyboard for data entry, which makes entering data for the scanned document difficult, slow, and prone to errors.

SUMMARY

Embodiments described herein provide the capability to offload a data entry activity from a MFP to a remote computing device, such as a user's computer, tablet, smart-phone, etc. The user is then able to utilize the remote computing device for the data entry activity rather than the MFP, which is more capable and easier to use than the MFP.

One embodiment is a controller of a Multi-Function Printer (MFP) that is configured to generate a scan of a document for a user, and to hold the scanned document pending a data entry activity that assigns metadata to the scanned document. The controller is configured to identify a remote computing device for performing the data entry activity by the user, to provide a notification to the remote computing device requesting the metadata for the scanned document, and to receive the metadata from the remote computing device. The controller is configured to assign the metadata to the scanned document, and to release the scanned document to a scan destination.

Another embodiment is a method of offloading a data entry activity from a MFP to a remote computing device. The method comprises generating, by the MFP, a scan of a document for a user, and holding, by the MFP, the scanned document pending a data entry activity that assigns metadata to the scanned document. The method further comprises identifying, by the MFP, a remote computing device for performing the data entry activity by the user, and providing, by the MFP, a notification to the remote computing device requesting the metadata for the scanned document. The method further comprises receiving, by the MFP, the metadata from the remote computing device, assigning, by the MFP, the metadata to the scanned document, and releasing, by the MFP, the scanned document to a scan destination.

In another embodiment, a server is configured to receive a scan of a document for a user from a MFP, and to hold the scanned document pending a data entry activity that assigns metadata to the scanned document. The server is further configured to identify a remote computing device for performing the data entry activity by the user, to provide a notification to the remote computing device requesting the metadata for the scanned document, and to receive the metadata from the remote computing device. The server is further configured to assign the metadata to the scanned document, and to release the scanned document to a scan destination.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
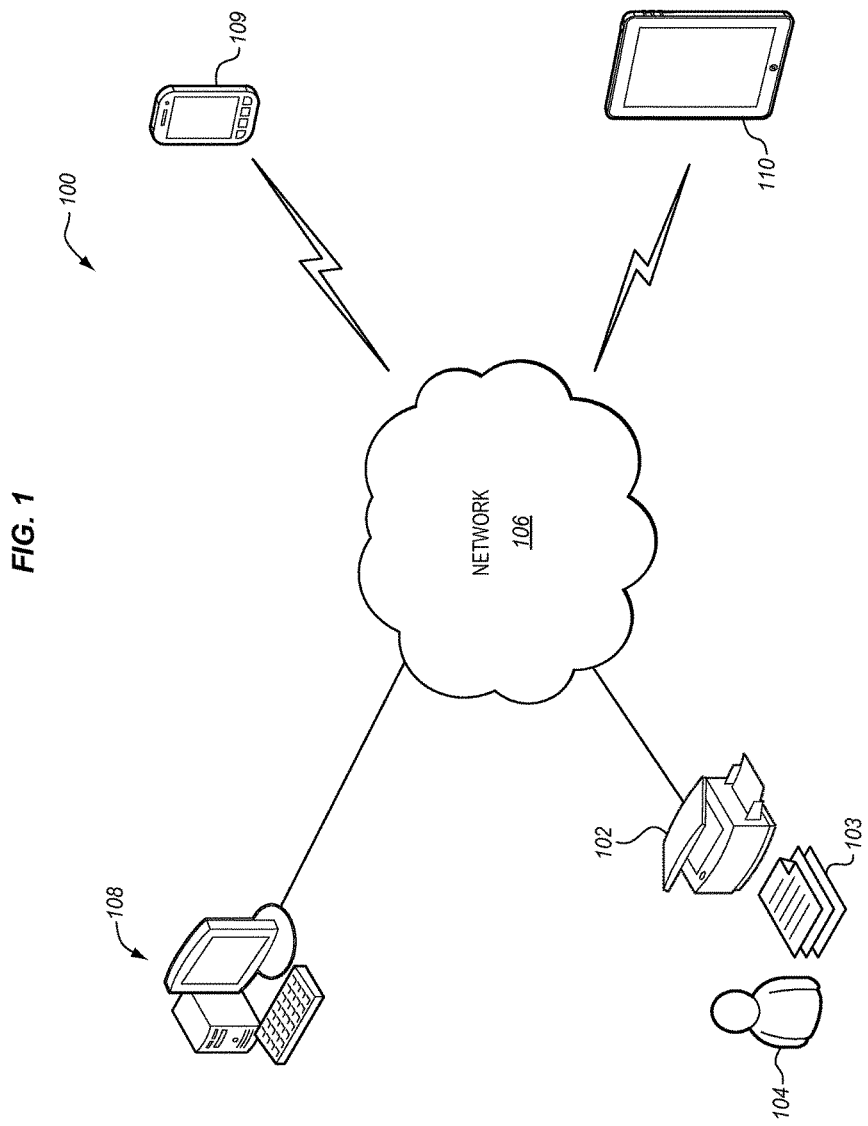
FIG. 1 is a block diagram of a system that utilizes a MFP to offload a data entry activity to a remote computing device in an exemplary embodiment.

FIG. 1 is a block diagram of a system 100 that utilizes a MFP to offload a data entry activity to a remote computing device in an exemplary embodiment. System 100 includes a MFP 102 coupled to a network 106. Also coupled to network 106 are a number of remote computing devices 108-110. In particular, three devices 108-110 are illustrated, although an implementation of system 100 may include more or fewer devices 108-110 as a matter of design choice. Also, system 100 is not necessarily limited to the particular devices 108-110 illustrated in FIG. 1. For purposes of discussion, device 108 comprises a computer, device 109 comprises a smart phone, and device 110 comprises a tablet.

MFP 102 is capable of communicating with devices 108-110 utilizing network 106, which may be a combination of wired and wireless networks as a matter of design choice. For instance, network 106 may include Ethernet networks, Wi-Fi networks, cellular networks such as a Global System for Mobile Communications (GSM) network, a Code Division Multiple Access (CDMA) network, etc. Thus, network 106 in FIG. 1 is a simplified representation of what may be a number of interconnected wired and wireless networks.

In this embodiment, MFP 102 is capable of offloading a data entry activity that would normally be performed at MFP 102 to remote computing devices 108-110. For instance, a user 104 may scan a document 103 at MFP 102, and MFP 102 will then offload, transfer, move, pass, etc., a data entry activity for the scanned document to one of devices 108-110. User 104 may wish to assign various pieces of information to the scanned document to allow the scanned document to be indexed, searched, etc. Generally, this type of information is called metadata. The metadata that may be assigned to the scanned document includes information such as a project ID for the scanned document, an author of the scanned document, keywords, etc. However, these are just a few examples of metadata that may be assigned to the scanned document. The metadata that may be assigned to the scanned document may include almost any piece of information.

One problem associated with entering data for a scanned document at a MFP is that MFP's typically do not include large displays or full-sized keyboards. Rather, MFP's often include soft keys on a smaller display, which makes it difficult to enter data for a scanned document in a timely and accurate manner. In the embodiment, MFP 102 is able to scan document 103 for user 104, and offload the data entry activity to devices 108-110.

Figure 2:
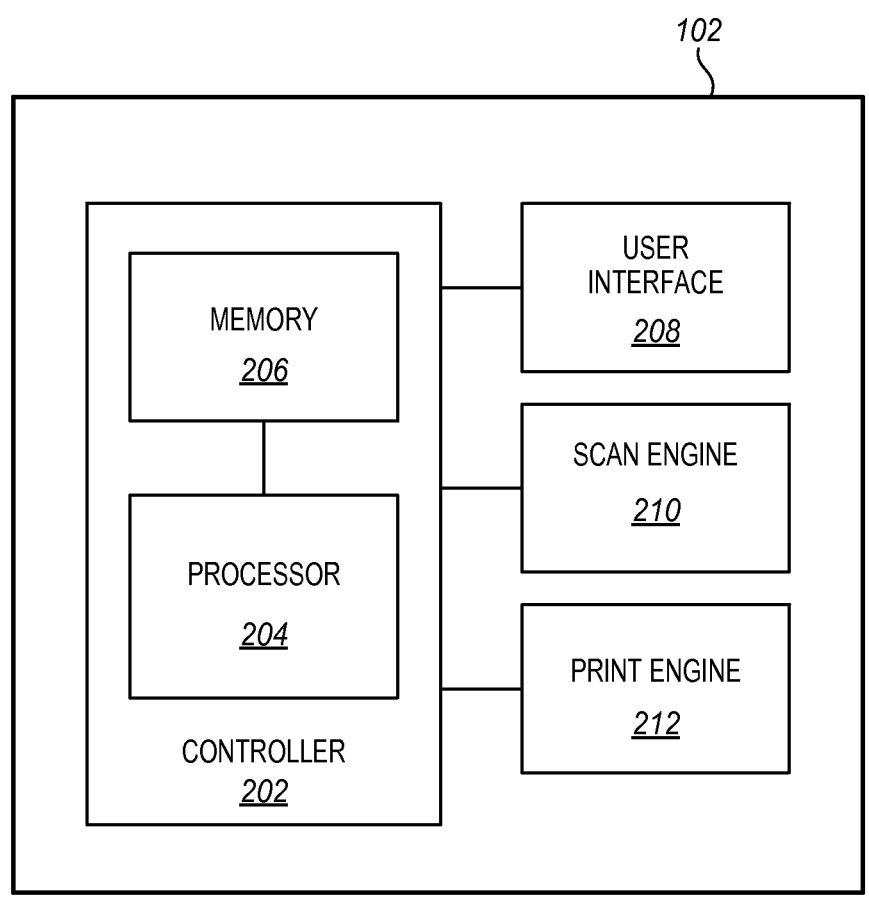
FIG. 2 is a block diagram of the MFP of FIG. 1 in an exemplary embodiment.

FIG. 2 is a block diagram of MFP 102 of FIG. 1 in an exemplary embodiment. In this embodiment, MFP 102 includes a controller 202 coupled to a user interface 208, a scan engine 210, and a print engine 212. Controller 202 in this embodiment includes a processor 204 and a memory 206. Processor 204 includes any hardware device that is able to perform functions. Processor 204 may include one or more Central Processing Units (CPU), microprocessors, Digital Signal Processors (DSPs), Application-specific Integrated Circuits (ASICs), etc. Some examples of processors include Intel® Core™ processors, Advanced Risk Machines (ARM®) processors, etc.

Memory 206 includes any hardware device that is able to store data. For instance, memory 206 may store scanned documents, may store information about user 104 (e.g., which devices 108-110 are capable of and/or are registered to allow user 104 to perform the data entry activity). Memory 206 may include one or more Dynamic Random Access Memory (DRAM) devices, FLASH devices, Static RAM devices, hard drives, Solid State Disks (SSDs), etc.

User interface 208 comprises any component, system, or device that allows user 104 to interface with MFP 102. For instance, user interface 208 may display information to user 104, may present user 104 with options (e.g., such as allowing user 104 to select a workflow for a scan job), etc. Some examples of user interface 208 include touch panels, Liquid Crystal Displays (LCDs), Plasma displays, Light Emitting Diode (LED) displays, Organic LED displays, etc.

Scan engine 210 comprises any component, system, or device that is able to convert physical documents (e.g., paper documents) to an electronic format. Print engine 212 comprises any component, system, or device that is able to transform an electronic format (e.g., a print job) to a printable medium (e.g., paper).

For this embodiment, assume that user 104 desires to utilize MFP 102 to scan document 103. User 104 may place document 103 in a document feed mechanism for MFP 102 (not shown), and utilize interface 208 of MFP 102 to initiate a scan process on MFP 102.

Figure 3:
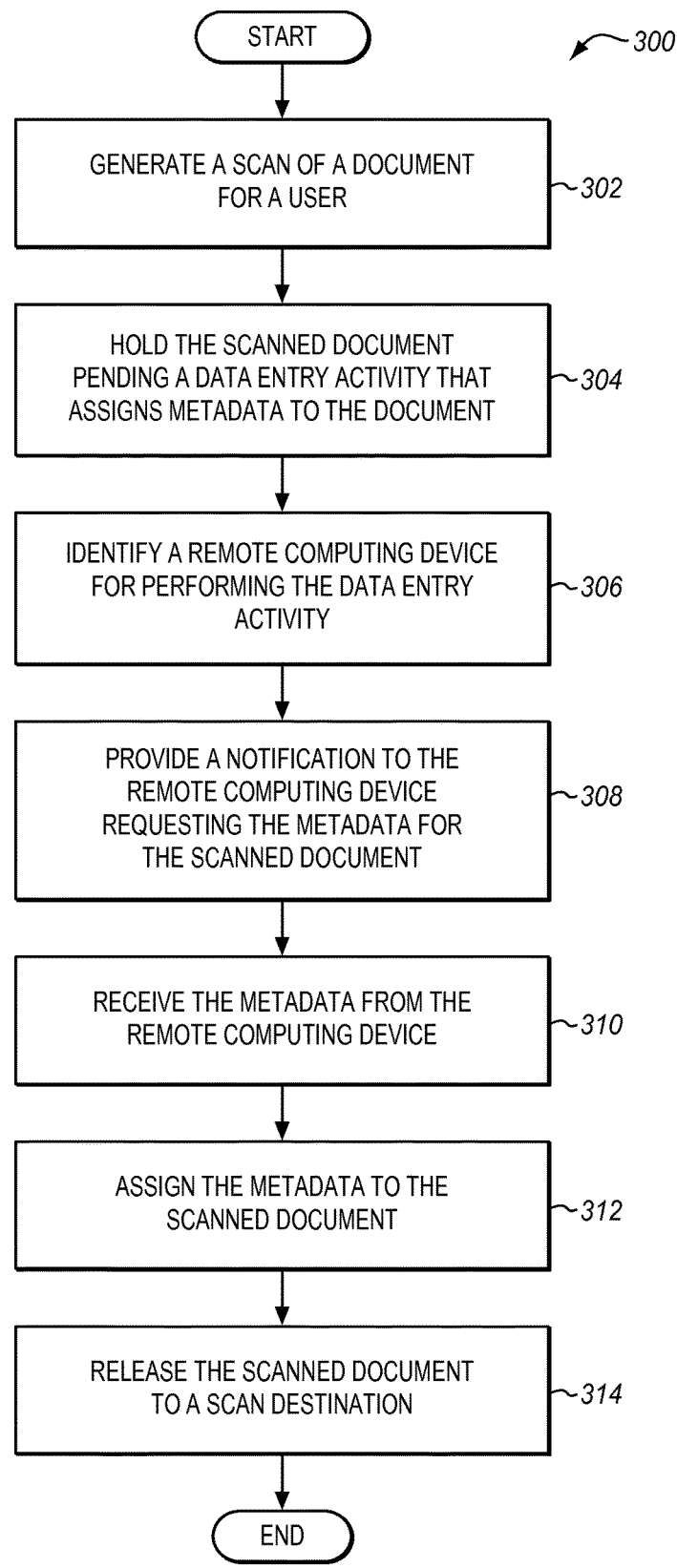
FIG. 3 is a flowchart illustrating a method of offloading a data entry activity from a MFP to a remote computing device in an exemplary embodiment.

FIG. 3 is a flowchart illustrating a method 300 of offloading a data entry activity from MFP 102 to a remote computing device in an exemplary embodiment. The steps of method 300 will be described with reference to controller 202 of FIG. 2, but those skilled in the art will appreciate that method 300 may be performed in other systems. The steps of the flowchart(s) described herein are not all inclusive and may include other steps not shown. The steps described herein may also be performed in an alternative order.

To begin the scan and offload activity, processor 204 generates a scan of document 103 for user 104 (see step 302). To do so, processor 204 may direct scan engine 210 to image document 103 and generate a bitmap image of document 103. Processor 204 may store the scanned document in memory 206.

Processor 204 holds the scanned document (e.g., in memory 206) pending a data entry activity that assigns metadata to the scanned document (see step 304). Typically, MFPs will immediately send a scanned document to a scan destination, such as a file server, a user's computer, etc. However, in this embodiment, processor 204 holds the scanned document. For instance, user 104 may have indicated at MFP 102 (e.g., using user interface 208) that this particular scan job is held pending a data entry activity by selecting a particular workflow for the scan job, by selecting an option at MFP 102, etc.

Processor 204 identifies one of devices 108-110 for performing the data entry activity by user 104 (see step 306). To identify one of devices 108-110, processor 204 may review computing devices that user 104 has registered with MFP 102. For instance, user 104 may register have registered computer 108, smart phone 109, and/or tablet 110 with MFP 102 for the data entry activity. This allows processor 204 to identify which, if any, computing devices user 104 has available for the data entry activity.

Processor 204 provides a notification to one of devices 108-110 previously identified requesting the metadata for the scanned document (see step 308). The notification may include an email sent to one of devices 108-110 previously identified, a text message sent to one of devices 108-110 previously identified, etc. In some cases, devices 108-110 may be executing a client application which communicates with MFP 102. In this case, processor 204 may notify the client application to generate a pop up window or other type of data entry object that user 104 can utilize to enter the metadata for the scanned document. The notification may include a HyperText Transfer Protocol (HTTP) link that user 104 may select for entering the metadata. For instance, smart phone 109 may receive an email from MFP 102, which includes a HTTP link. User 104 may then select the link to load a web page in a HTTP browser, which includes data fields for the data entry activity performed by user 104. Such data fields may be based on a particular workflow that user 104 selects when scanning document 103. For instance, a particular workflow may define which metadata fields that user 104 is to complete for the scanned document. In some embodiments, user 104 is able to review the scanned document during the data entry phase, which allows user 104 to decide whether to continue processing the scanned document or to cancel the process and re-scan document 103 (e.g., if errors are found).

Some metadata examples for a scanned document include a priority of the scanned document, a document type of the scanned document, a department for scanned document, a customer for the scanned document, a project associated with the scanned document, a security classification of the scanned document, a keyword for indexing the scanned document, a category of the scanned document, etc. In response to entering the metadata, user 104 may then indicate that the data entry activity is complete to transfer the metadata to MFP 102. For instance, user 104 may select a button within the web page that sends the entered data to MFP 102 and closes the data entry session.

Processor 204 receives the metadata entered by user 104 at one of devices 108-110 previously identified, and assigns the metadata to the scanned document (see steps 310-312). Assigning the metadata to the scanned document may include modifying portions of the scanned document (e.g., data fields, Extensible Markup Language (XML) fields, etc.), creating a separate file with the metadata, etc.

Processor 204 will then release the scanned document including the assigned metadata to a scan destination. For instance, MFP 102 may transmit the scanned document and the assigned metadata to a file server or document repository. Generally, a scan destination for the MFP comprises a device that the MFP transmits the scanned document and the assigned metadata to directly. For instance, if the scan destination is a file server, then the MFP transmits the scanned document and the assigned metadata directly to the file server.

In some embodiments, user 104 may register remote computing devices with MFP 102 that are capable of allowing user 104 to perform the data entry activity. This allows MFP 102 to identify a particular device that is associated with user 104 when determining where to provide the notification about the data entry activity. For instance, user 104 may register tablet 110 with MFP 102 prior to generating the scanned document. To do so, user 104 may utilize tablet 110 to browse to a particular web page (e.g., a registration page hosted by MFP 102 or some other device), and register a particular device (e.g., utilizing a Media Access Control (MAC) address, an Internet Protocol (IP) address, an email address, a phone number, etc.).

By allowing user 104 to offload a data entry activity from MFP 102 to devices 108-110, user 104 is able to quickly and accurately enter in metadata for a particular scanned document using devices 108-110. This reduces the amount of time and effort for this activity at MFP 102, and also frees up MFP 102 for use by others that may be attempting to scan documents as well.

Figure 4:
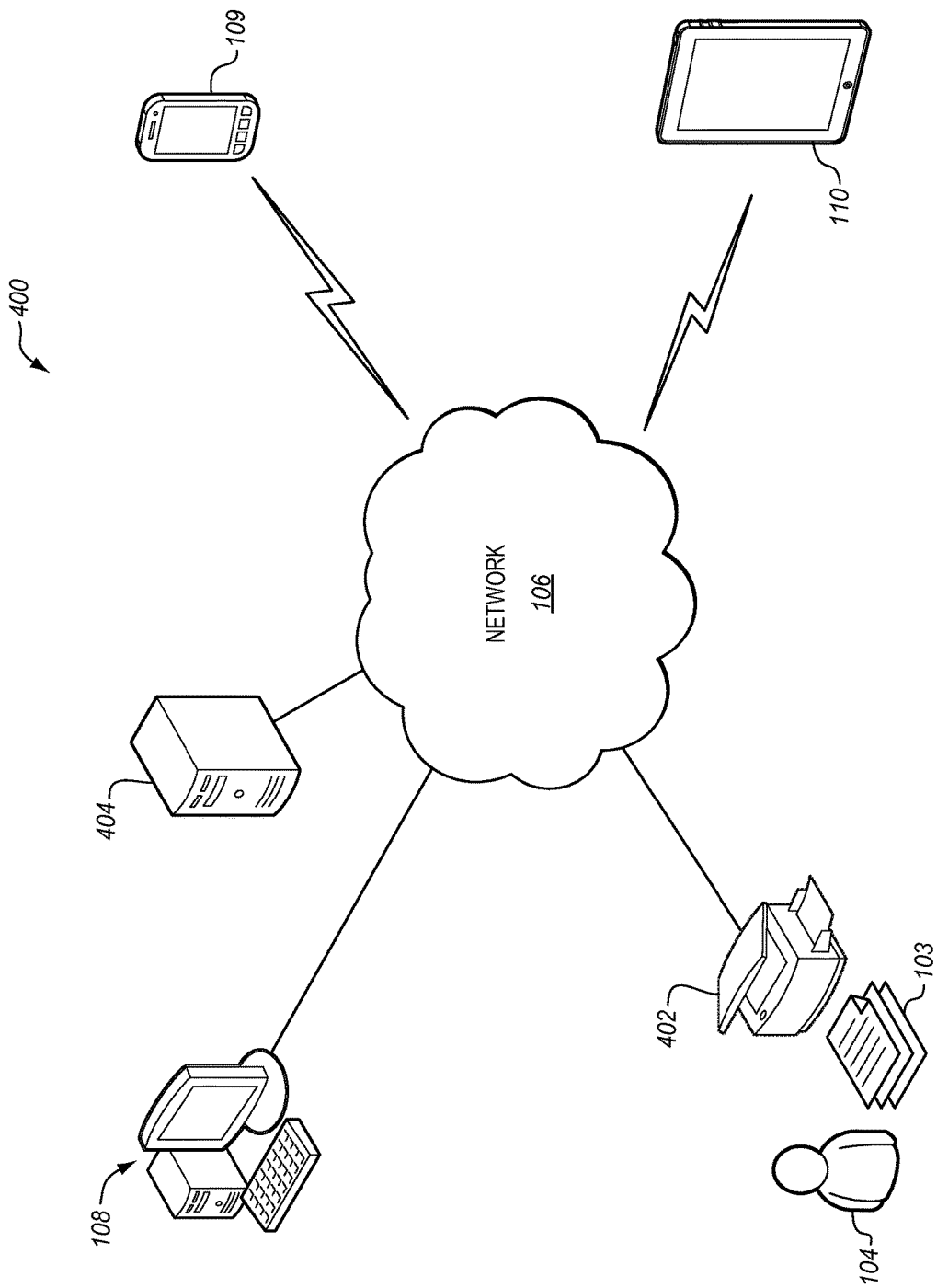
FIG. 4 is a block diagram of a system that utilizes a server to offload a data entry activity from a MFP to a remote computing device in an exemplary embodiment.

In some embodiments, a MFP may interact with a server to allow a MFP to offload a data entry activity to devices 108-110. FIG. 4 is a block diagram of another system that offloads a data entry activity from a MFP to a remote computing device in an exemplary embodiment. In this embodiment, a MFP 402 communicates with a server 404 via network 106. Server 404 is capable of offloading a data entry activity that would normally be performed at MFP 402 to devices 108-110. For example, rather than holding a scanned document pending a data entry activity by user 104, MFP 402 forwards the scanned document to server 404 along with an indication that a data entry activity is pending for the scanned document.

Figure 5:
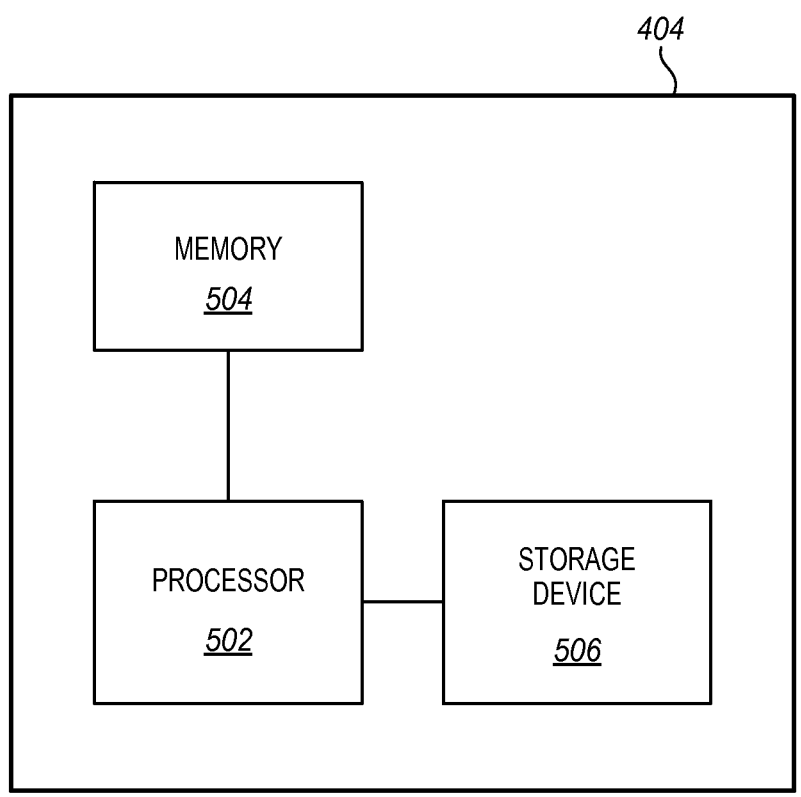
FIG. 5 is a block diagram of the server of FIG. 4 in an exemplary embodiment.

FIG. 5 is a block diagram of server 404 of FIG. 4 in an exemplary embodiment. In this embodiment, server 404 includes a processor 502 coupled to a storage device 504. Processor 502 includes any hardware device that is able to perform functions. Processor 502 may include one or more CPUs, microprocessors, DSPs, ASICs, etc. Storage device 504 includes any hardware device that is able to store data. For instance, storage device 504 may store scanned documents, may store information about user 104 (e.g., which devices 108-110 are capable of and/or are registered to perform the data entry activity by user 104). Storage device 504 may include one or more hard drives, SSDs, etc.

Figure 6:
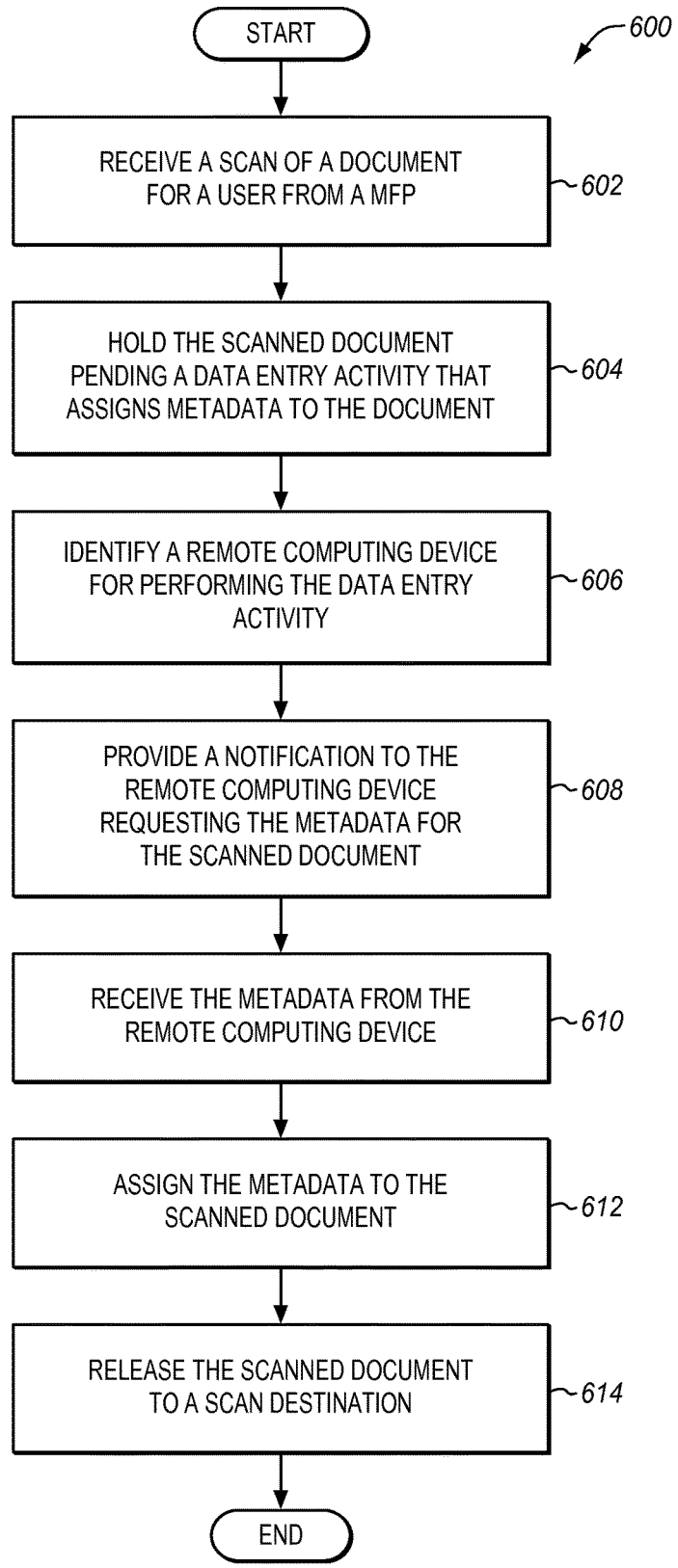
FIG. 6 is a flowchart illustrating another method of offloading a data entry activity from a MFP to a remote computing device in an exemplary embodiment.

FIG. 6 is a flowchart illustrating a method 600 of offloading a data entry activity from a MFP to a remote computing device in an exemplary embodiment. The steps of method 600 will be described with reference to processor 502 of FIG. 5, but those skilled in the art will appreciate that method 600 may be performed in other systems. To begin the scan and offload activity, MFP 402 generates a scan of document 103 for user 104. MFP 402 forwards the scanned document to server 404. Processor 502 of server 404 receives the scanned document (see step 602) and holds the scanned document pending a data entry activity (see step 604). Processor 502 may store the scanned document at storage device 504 while awaiting the data entry activity by user 104.

Processor 502 identifies one of devices 108-110 for performing the data entry activity by user 104 (see step 606). This step may be similar to step 306 of FIG. 3 previously described. Processor 502 provides a notification to one of devices 108-110 previously identified requesting the metadata for the scanned document (see step 608). This step may be similar to step 308 of FIG. 3 described previously. In some embodiments, the notification may include an email sent by processor 502 to one of devices 108-110 previously identified. The email may include a number of data fields that user 104 may enter the metadata next to. For instance, the email may be formatted as a list that allows user 104 to enter the information within a reply email to server 404.

To identify the specific metadata for a scanned document, user 104 may have selected a particular workflow for a scan job that defines the metadata that is to be entered by user 104. This workflow information may be provided by MFP 402 to server 404, which then is able to determine which metadata to request from end user 104 via the notification. In response to entering the metadata, user 104 may then indicate that the data entry activity is complete to transfer the metadata to server 404. For instance, user 104 may hit a send button on the reply email which sends the entered data to server 404. Processor 502 receives the metadata entered by user 104 from one of devices 108-110 previously identified, and assigns the metadata to the scanned document (see steps 610-612). Processor 502 will then release the scanned document including the assigned metadata to a scan destination (see step 614).

Example

Figure 7:
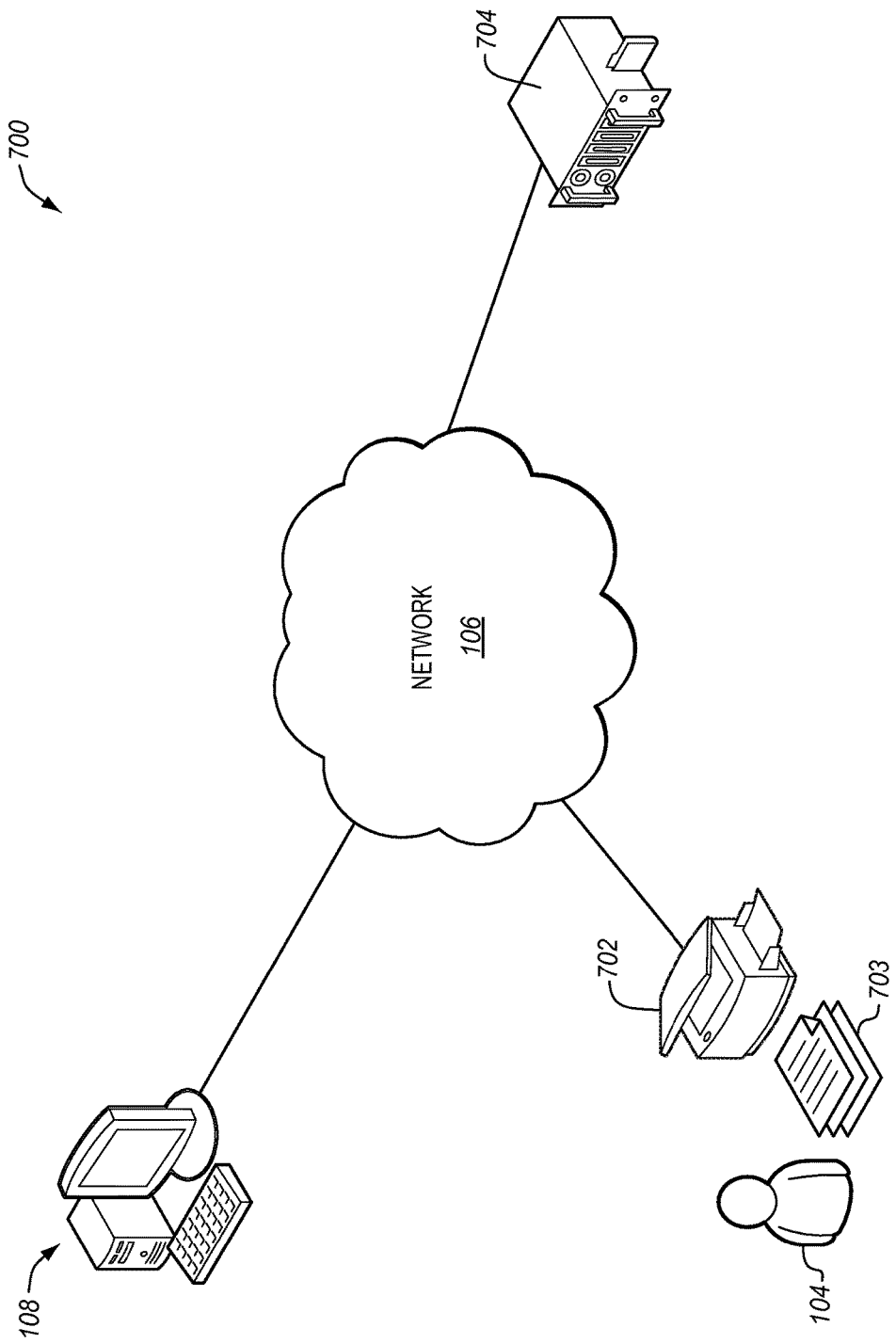
FIG. 7 is a block diagram of another system that offloads a data entry activity from a MFP to a remote computing device in an exemplary embodiment.

The following example will be discussed with respect to system 700 of FIG. 7. The example is not intended to define a preferred embodiment or limit the scope of the claims but rather, is intended to provide one possible implementation of offloading a data entry activity to a remote computing device.

Assume for this embodiment that user 104 approaches a MFP 702 with the intent to scan document 703. User 104 selects a scan workflow at MFP 702 for the scan job. In the example, the scan workflow defines three items of metadata for the scan job that will be entered by user 104, along with a pre-defined scan destination of file server 704. The three items of metadata for the scan job include a department (e.g., accounting, finance, marketing, etc.), a keyword for searching the scanned document, and a customer number. Although the scan destination of file server 704 is defined by the workflow in the example, in other embodiments the scan destination may be entered by user 104 when performing the data entry activity at devices 108-110.

After selecting the workflow, user 104 scans document 703 at MFP 702 and returns to computer 108. MFP 702 processes the selected workflow for the scan job and identifies that three items of metadata are needed from user 104 for the scan job. MFP 702 dynamically generates a web page that identifies the metadata and includes text fields to allow user 104 to enter the requested metadata. MFP 702 then creates a HTTP link to the dynamic page, and emails the HTTP link to user 104. User 104 had previously registered an email address with MFP 702 for this activity.

User 104 receives the email at computer 108, and uses a web browser and the HTTP link in the email to browse to the web page dynamically created by MFP 702 for the data entry activity. User 104 then enters the requested metadata, using the web browser executing on computer 108. When user 104 has completed the data entry activity for the requested metadata, user 104 selects a "submit" button on the web page, which transfers the requested metadata to MFP 702. With the requested metadata now available to MFP 702, MFP 702 assigns the metadata to the scanned document and releases the scanned document to file server 704.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as non-transitory instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

I claim:

1. An apparatus comprising:
a controller of a scanner configured to receive a request from a user to register a plurality of remote computing devices at the scanner for remotely assigning metadata to a scanned document generated by the scanner, to generate the scanned document at the scanner for the user, and to hold the scanned document pending a data entry activity by the user at one of the plurality of remote computing devices;
the controller configured to identify a workflow associated with the scanned document, and to identify the metadata for the scanned document based on the workflow;
the controller configured to identify one of the plurality of remote computing devices for performing the data entry activity by the user from the plurality of remote computing devices that are registered at the scanner, to generate a web page that requests the metadata based on the workflow, and to provide a Hypertext Transfer Protocol (HTTP) link for the web page to the one of the plurality of remote computing devices;
the controller configured to receive a request from the one of the plurality of remote computing devices for the web page, to provide the web page to the one of the plurality of remote computing devices for entering the metadata for the scanned document from the user, and to receive the metadata for the scanned document utilizing the web page provided to the one of the plurality of remote computing devices; and
the controller configured to assign the metadata received from the web page provided to the one of the plurality of remote computing devices to the scanned document, and to release the scanned document to a scan destination.

2. The apparatus of claim 1 wherein:
the controller is configured to provide the HTTP link to the one of the plurality of remote computing devices utilizing an email.

3. The apparatus of claim 1 wherein:
the controller is configured to provide the HTTP link to the one of the plurality of remote computing devices utilizing a text message.

4. The apparatus of claim 1 wherein:
the controller is configured to provide the HTTP link to the one of the plurality of remote computing devices utilizing a client application executing on the one of the plurality of remote computing devices.

5. The apparatus of claim 1 wherein:
the one of the plurality of remote computing devices comprises a mobile device configured to receive the HTTP link from the scanner via a wireless network, and to provide the metadata to the scanner via the wireless network utilizing the web page.

6. The apparatus of claim 1 wherein:
the controller is configured to hold the scanned document pending a data entry activity that assigns the scan destination to the scanned document.

7. A method comprising:
receiving, by a scanner, a request from a user to register a plurality of remote computing devices at the scanner for remotely assigning metadata to a scanned document generated by the scanner;
generating, by the scanner, the scanned document for the user;
holding, by the scanner, the scanned document pending a data entry activity by the user at one of the plurality of remote computing devices;
identifying, by the scanner, a workflow associated with the scanned document;
identifying, by the scanner, the metadata for the scanned document based on the workflow;
identifying, by the scanner, one of the plurality of remote computing devices for performing the data entry activity by the user from the plurality of remote computing devices that are registered at the scanner;
generating, by the scanner, a web page that requests the metadata based on the workflow;
providing, by the scanner, a Hypertext Transfer Protocol (HTTP) link for the web page to the one of the plurality of remote computing devices;

receiving, by the scanner, a request from the one of the plurality of remote computing devices for the web page;

providing, by the scanner, the web page to the one of the plurality of remote computing devices for entering the metadata for the scanned document from the user;

receiving, by the scanner, the metadata for the scanned document utilizing the web page provided to the one of the plurality of remote computing devices;

assigning, by the scanner, the metadata received from the web page provided to the one of the plurality of remote computing devices to the scanned document; and releasing, by the scanner, the scanned document to a scan destination.

8. The method of claim 7, wherein providing the HTTP link further comprises:

providing the HTTP link to the one of the plurality of remote computing devices utilizing an email.

9. The method of claim 7, wherein providing the HTTP link further comprises:

providing the HTTP link to the one of the plurality of remote computing devices utilizing a text message.

10. The method of claim 7, wherein providing the HTTP link further comprises:

providing the HTTP link to the one of the plurality of remote computing devices utilizing a client application executing on the one of the plurality of remote computing devices.

11. The method of claim 7, wherein:

the one of the plurality of remote computing devices comprises a mobile device configured to receive the HTTP link from the scanner utilizing a wireless network, and to provide the metadata to the scanner via the wireless network utilizing the web page.

12. The method of claim 7 wherein holding the scanned document further comprises:

holding the scanned document pending a data entry activity that assigns the scan destination to the scanned document.

13. An apparatus comprising:

a server configured to receive a request from a user to register a plurality of remote computing devices at the server for remotely assigning metadata to a scanned document generated by a scanner, to receive the scanned document from the scanner for the user, and to hold the scanned document pending a data entry activity by the user at one of the plurality of remote computing devices;

the server configured to identify a workflow associated with the scanned document, and to identify the metadata for the scanned document based on the workflow;

the server configured to identify one of the plurality of remote computing devices for performing the data entry activity by the user from the plurality of remote computing devices that are registered at the server, to generate a web page that requests the metadata based on the workflow, and to provide a Hypertext Transfer Protocol (HTTP) link for the web page to the one of the plurality of remote computing devices;

the server configured to receive a request from the one of the plurality of remote computing devices for the web page, to provide the web page to the one of the plurality of remote computing devices for entering the metadata for the scanned document from the user, and to receive the metadata for the scanned document utilizing the web page provided to the one of the plurality of remote computing devices; and the server configured to assign the metadata received from the web page provided to the one of the plurality of remote computing devices to the scanned document, and to release the scanned document to a scan destination.

14. The apparatus of claim 13, wherein:

the server is configured to provide the HTTP link to the one of the plurality of remote computing devices utilizing at least one of an email and a client application executing on the one of the plurality of remote computing devices.

15. The apparatus of claim 13, wherein:

the server is configured to provide the HTTP link to the one of the plurality of remote computing devices utilizing a text message.

16. The apparatus of claim 13, wherein:

the one of the plurality of remote computing devices comprises a mobile device configured to receive the HTTP link from the server utilizing a wireless network, and to provide the metadata to the server via the wireless network utilizing the web page.

17. The apparatus of claim 13, wherein:

the server is configured to hold the scanned document pending a data entry activity that assigns the scan destination to the scanned document.

* * * * *